United States Patent
Asa et al.

[19]

[11] Patent Number: 6,158,559
[45] Date of Patent: Dec. 12, 2000

[54] BEARING DEVICE OF PISTON ROD

[75] Inventors: Takashi Asa; Mitsuhiro Hasegawa, both of Tokyo; Kiyomi Morino, Kurita-gun; Masayuki Kohama, Moriyama; Hideaki Shinyashiki, Toyota, all of Japan

[73] Assignee: Oiles Corporation, Tokyo, Japan

[21] Appl. No.: 09/155,805

[22] PCT Filed: Apr. 9, 1997

[86] PCT No.: PCT/JP97/01219

§ 371 Date: Oct. 6, 1998

§ 102(e) Date: Oct. 6, 1998

[87] PCT Pub. No.: WO97/38241

PCT Pub. Date: Oct. 16, 1997

[30] Foreign Application Priority Data

Apr. 9, 1996 [JP] Japan ................................ 8-112071

[51] Int. Cl.[7] .................................................. F16F 9/36
[52] U.S. Cl. .................................. 188/322.17; 267/64.11
[58] Field of Search .................... 188/322.17, 322.16, 188/322.19, 322.12, 315, 320, 312; 267/64.15, 64.11

[56] References Cited

U.S. PATENT DOCUMENTS

| | | | |
|---|---|---|---|
| 4,544,144 | 10/1985 | Ishida et al. | 188/322.17 X |
| 5,176,229 | 1/1993 | Kanari et al. | 188/322.17 |
| 5,178,243 | 1/1993 | Hamada et al. | 188/322.17 |
| 5,224,573 | 7/1993 | Amemiya et al. | 188/322.17 |
| 5,477,949 | 12/1995 | Forster et al. | 188/322.17 |
| 5,533,598 | 7/1996 | Adrian et al. | 188/322.17 |
| 5,643,683 | 7/1997 | Tanaka et al. | 428/551 |

FOREIGN PATENT DOCUMENTS

| | | |
|---|---|---|
| 55-23226 | 6/1955 | Japan . |
| 62-38574 | 8/1987 | Japan . |
| 4-7745 | 1/1992 | Japan . |
| 5-47569 | 6/1993 | Japan . |
| 5-248472 | 9/1993 | Japan . |

*Primary Examiner*—Matthew C. Graham
*Assistant Examiner*—Melanie Talavera
*Attorney, Agent, or Firm*—Rabin & Champagne PC

[57] ABSTRACT

A piston rod is supported free to slide without using a guide bush so that there is no risk of the guide bush falling out. Also, costs are reduced and oil leakage is prevented by eliminating additional procedures such as caulking. The piston rod, which has excellent durability, is allowed to slide smoothly over a long period of time without generating noise. For this purpose, in a bearing unit for a single cylinder type hydraulic damper or gas spring, or a multi-cylinder type hydraulic damper comprising seal members 55, 56, 57 and 64, and a rod guide 6, the rod guide 6 comprises a cylindrical engaging part 13 which engages with a cylinder 2, a cylindrical bearing part 16 which guides a piston rod 5, and a bearing layer 15 fixed to the inner circumferential surface of the cylindrical bearing which slides on the outer surface of the piston rod. The bearing layer is previously fixed only at a position of a base material comprising a thin steel plate which becomes the cylindrical bearing part, and the rod guide is formed in a one-piece construction by press-molding or deep-drawing this base material.

18 Claims, 9 Drawing Sheets

BEARING DEVICE OF PISTON ROD

FIELD OF THE INVENTION

This invention relates to a piston rod bearing unit such as a hydraulic damper or gas spring suitable for the suspension in an automobile or two-wheeled vehicle.

BACKGROUND OF THE INVENTION

Hydraulic dampers or gas springs used in automobiles or two-wheeled vehicles are either a single cylinder type comprising one cylinder or a multi-cylinder type comprising an outer cylinder and inner cylinder. In both cases, the inside of the cylinder is divided into two chambers by a piston. A piston rod has an end connected to the piston. The piston rod is supported and guided free to slide by a rod guide in the cylinder, this rod guide acting as a bearing unit at the open end of the cylinder.

A rod guide which functions as a piston rod bearing in this way is disclosed in Tokko Sho 62-38574, Jikko Sho 55-23226 and Jikkai Hei 5-47569 published by the Japanese Patent Office.

The rod guide described in Tokko Sho 62-38574 is press-formed, the piston rod being directly guided on the inner circumferential surface of the rod guide. The rod guide disclosed in Jikko Sho 55-23226 and Jikkai Hei 5-47569 is molded from a plate member, and comprises a supporting part which fits on the cylinder inner circumference and a cylindrical bearing part which supports the piston rod. To support the piston rod in the cylinder bearing part so that it is free to slide, the rod guide is further provided with a guide bush which fits on the inner circumference of the cylindrical bearing part.

However, the rod guide disclosed in Tokko Sho 62-38574 guides the piston rod directly, and therefore has inferior sliding properties.

Sliding improves if a guide bush is installed in the rod guide as disclosed in Jikko Sho 55-23226 and Jikkai Hei 5-47569. However, when the guide bush is engaged with the inner circumference of the cylindrical bearing part, the guide bush may fall out of the cylindrical bearing unit when the piston rod slides if there is only a weak fit. In order to prevent the guide bush from falling out, it is necessary to push the guide in as shown in Jikko Sho 55-23226 or to join the upper end of the cylindrical bearing part by caulking and provide a stopper at the lower end of the cylindrical bearing part as shown in Jikkai Hei 5-47569.

In order to prevent the guide bush falling out by caulking and stopper, the rod guide which is formed in one piece from a metal plate must have a caulking part and some means of attaching a stopper. This also involved complex assembly work and increased costs.

Moreover, the guide bush must be precision-machined so that the join surfaces fit exactly when the bush is pushed in. If it is not precision-machined, a gap may appear between the join surfaces or projecting ridges may be formed.

If such a gap is present between the join surfaces, oil in the cylinder may leak out and may considerably impair the function of the hydraulic damper. On the other hand, if there are projecting ridges, a gap may be formed between the guide bush and rod guide, and a similar problem may be caused. In this case, there is also a possibility that scratches may occur on the surface of the piston rod, smooth movement of the piston rod may be prevented, and the guide bush may deteriorate starting in the part where there are projections so as to cause early damage.

In addition, when the piston rod is supported free to slide in this way by the rod guide formed in one-piece from a plate and the guide bush which engages with it, as shown in Jikkai Hei 5-47569, the sliding resistance depends not only on the material of the guide bush but also on the manufacturing precision of both the rod guide and guide bush. Therefore, if both of these components are not precision machined, the piston rod cannot slide smoothly, noise is caused, and oil in the cylinder leaks.

It is therefore an object of this invention to support a piston rod such that it is free to slide smoothly even if a guide bush is not used.

It is also an object of this invention to prevent the risk of the guide bush falling out by making the guide bush unnecessary. This obviates the need for additional operations such as caulking, etc., improves productivity and decreases cost.

It is a further object of this invention to effectively prevent oil leakage, and to provide a piston rod with excellent durability which is able to slide smoothly for a long period of time without generating noise.

SUMMARY OF THE INVENTION

To achieve the above object, according to this invention, in a bearing unit for a hydraulic damper or gas spring comprising a piston rod free to move in a cylinder, the piston rod being guided by a seal member and rod guide at one end of the cylinder so that the piston rod is free to slide, the rod guide comprises a cylindrical engaging part which engages with the end of the cylinder, a cylindrical bearing part which guides the piston rod and a bearing layer fixed to the inner circumferential surface of the cylindrical bearing part which slides on the outer circumference of the piston rod. The bearing layer is previously fixed to a part of the base material comprising a thin steel plate which becomes the cylindrical bearing part, and the rod guide is formed in a one-piece construction by press-molding and deep-drawing.

It is desirable that an annular supporting part, which extends outwards in a radial direction from the upper end of the cylindrical engaging part, is seated on a cylinder end face and this annular supporting part is joined by welding or caulking to the cylinder end.

A seal member with a core may be provided in series with the rod guide at the cylinder end, an annular supporting part may be provided which extends outwards in a radial direction from the upper end of the cylindrical engaging part and is seated on a step in the vicinity of the cylinder end, and this annular supporting part may be joined to the cylinder end by caulking together with the core part of the seal member.

The seal member can be arranged in series further inside than the rod guide along the cylinder axis line.

To achieve the above object, according to this invention, in a bearing unit for a multi-cylinder type hydraulic damper comprising a piston rod free to move in an inner cylinder, an outer cylinder forming a reservoir provided outside the inner cylinder, the piston rod being guided by a seal member and rod guide at one end of the inner cylinder and one end of the outer cylinder so that the piston rod is free to slide, the rod guide comprises a cylindrical engaging part which engages with the end of the inner cylinder, a cylindrical bearing part which guides the piston rod, a bearing layer fixed to the inner circumferential surface of the cylindrical bearing part which slides on the outer circumference of the piston rod, and an outer cylinder attachment joined to one end of the outer cylinder. The bearing layer is previously fixed to a part of the base material comprising a thin steel plate which becomes the cylindrical bearing part, and the rod guide is formed in a one-piece construction by press-molding and deep-drawing the base material.

The outer cylinder attachment preferably comprises a cylindrical part of larger diameter than the cylindrical engaging part.

The outer cylinder attachment preferably comprises a flange extending outwards in a radial direction from the cylindrical engaging part.

The outer cylinder attachment is preferably welded to the outer cylinder or a cap joined to the outer cylinder.

Preferably, a seal member with a core part may be provided in series with the rod guide at the inner cylinder end and outer cylinder end, and the outer cylinder attachment and core of the seal member are joined to the outer cylinder end by caulking.

A leak oil return passage connected to the reservoir preferably opens to the outer cylinder attachment.

Preferably, in the aforesaid hydraulic dampers or gas springs, the bearing layer comprises a porous sintered metal layer fixed to the inner circumferential surface of the cylindrical bearing part, and a synthetic resin layer whereof part is filled in the pores of the porous sintered metal layer and part is attached as a thin layer on the surface of the porous sintered metal layer.

It is preferable that a gap is left outside the cylindrical bearing part, and the cylindrical engaging part is provided via a connecting part.

A curved surface which curves toward the outside is also preferably formed at the top or bottom end, or both ends, of the bearing layer.

Therefore, according to this invention, the base material surface fixed with the bearing layer beforehand is press-molded and deep-drawn and the bearing layer guides the piston rod so that it can slide. As a result, there is no risk that the bearing layer will fall out due to the sliding of the piston rod, and there is no need to form a stopping means such as a caulking part in the bearing unit. As this additional processing is unnecessary, assembly is very easy. Moreover, manufacture is also easy so that costs are largely reduced.

As the rod guide has no join surface, there is no oil leakage from the join surface, and loss of function due to such leakage is prevented.

The rod guide is formed in a one-piece construction by press-molding or deep-drawing from a plate material, and it can therefore be easily manufactured with a desired precision. Consequently, a desirable smooth sliding motion of the piston rod is obtained, there is no noise due to manufacturing defects, and there is no oil leakage in the cylinder.

Moreover, if the rod guide is arranged outside the seal member, the bearing layer can be a dry bearing, so there is little risk of soiling from oil splashes and sliding can be improved.

The bearing layer comprises a porous sintered metal layer and a synthetic resin layer whereof the part is filled in the pores of this porous sintered metal layer, and part is attached as the synthetic resin layer as a thin layer on the sintered metal layer. Therefore, the synthetic resin layer guides the piston rod in contact with it and a smooth piston sliding motion is obtained. As low friction is still maintained due to the synthetic resin which is filled in the pores of the porous sintered metal layer, even if the surface synthetic resin layer wears out, the desired characteristics can effectively be obtained for a long period of time.

Moreover, as a cylindrical engaging part which engages with the inner circumference of the inner cylinder is provided on the outer circumference of the cylindrical bearing part leaving a gap via a connecting part, the cylindrical bearing can incline to follow the piston rod even when the piston rod inclines, so smooth sliding is guaranteed without loss of sliding ability.

DESCRIPTION OF THE PREFERRED EMBODIMENTS

This invention will now be described in detail with reference to the appended drawings.

Figure 1:
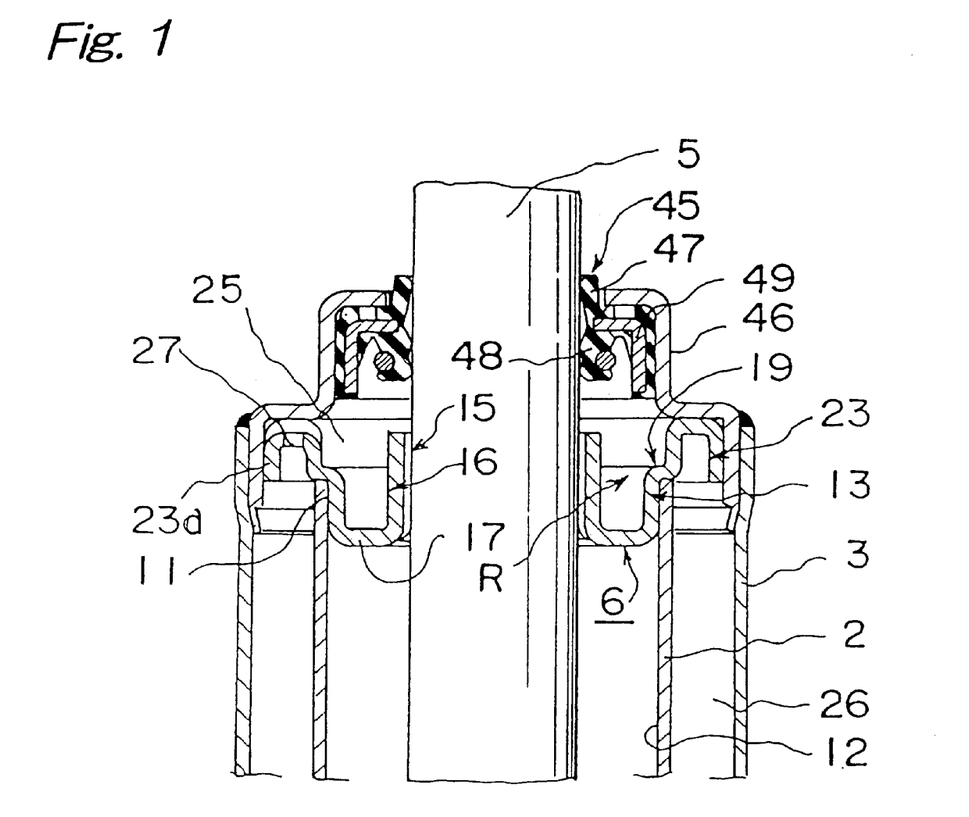
FIG. 1 is a partial cross-sectional view of a multi-cylinder type hydraulic damper according to one embodiment of this invention.

FIG. 1 shows a multi-cylinder type hydraulic damper.

The hydraulic damper comprises an inner cylinder 2, a piston rod 5 inserted free to move via a piston in the inner cylinder 2, an outer cylinder 3 forming a reservoir 26 outside the inner cylinder 2, a rod guide 6 installed in series with the upper end of the inner cylinder 2 and outer cylinder 3, and an oil seal 45.

A cap 46 is welded above the outer cylinder 3. The oil seal 45 comprising a dust lip 47, oil lip 48 and core 49 is held in the cap 46.

The rod guide 6 is formed in a one-piece construction by press-molding or deep-drawing from a plate member such as a thin steel plate.

Figure 4:
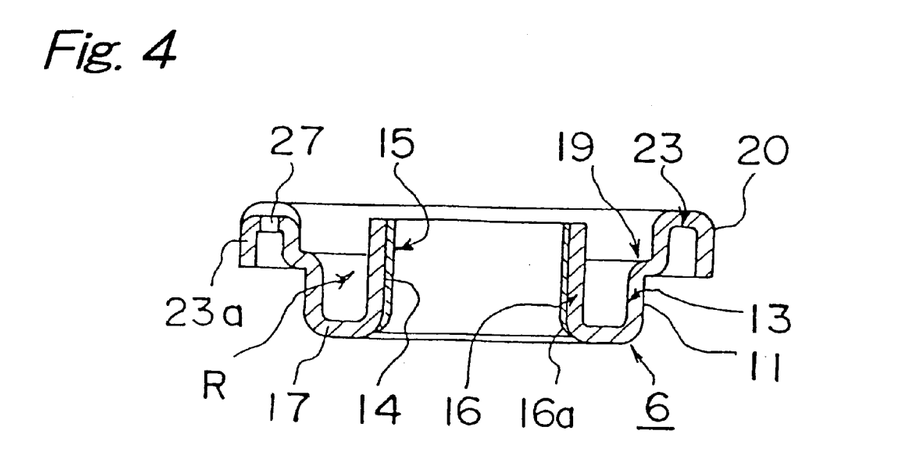
FIG. 4 is a cross-sectional view of a rod guide according to one embodiment.

The rod guide 6 comprises a cylindrical engaging part 13 and cylindrical bearing part 16 as a double cylinder as shown in FIG. 1 and FIG. 4. An outer cylindrical surface 11 of the cylindrical engaging part 13 engages with an inner circumferential surface 12 of the inner cylinder 2. A bearing layer 15 is previously fixed to the inner circumferential surface 14 of the cylindrical bearing part 16 so as to cover the inner circumferential surface 14. A connecting part 17 is provided connecting the lower ends of the engaging part 13 and bearing part 16 so as to leave a predetermined gap between them.

An annular supporting part 19 is formed stepwise toward the outside in a radial direction from the upper end of the engaging part 13, and is seated on the annular upper end of the inner cylinder 2. An engaging part 20 with an inverted U-shaped cross-section which extends in an axial direction from the outer circumference of this annular supporting part 19, has a tip bent outwards in the shape of a flange and has an outer circumferential surface which engages with the inner circumferential surface of the cap 46, is provided as an outer cylinder attachment 23.

A leak oil return passage 27 connecting a chamber 25 above the rod guide 6 to the reservoir 26 between the inner cylinder 2 and outer cylinder 3, which returns oil that has leaked into the chamber 25 to the reservoir 26, is formed in the outer cylinder attachment 23.

The cylindrical bearing part 16 extends upwards in the axial direction from the inner edge of the connecting part 17, but may extend downwards in the axial direction.

The lower inner circumference of the cylindrical bearing part 16 curves outwards, and a curved surface 16*a* is thereby formed of which the lower end points outwards together with the bearing layer 15.

The outer cylinder attachment 23 comprises a cylindrical part 23*a* of larger diameter than the cylindrical engaging part 13. As shown in FIG. 1, the cylindrical part 23*a* is press-inserted into the inner circumference of the cap 46 and is joined by welding or the like, but it may also be joined by welding, etc., to the outer cylinder 3.

Figure 3:
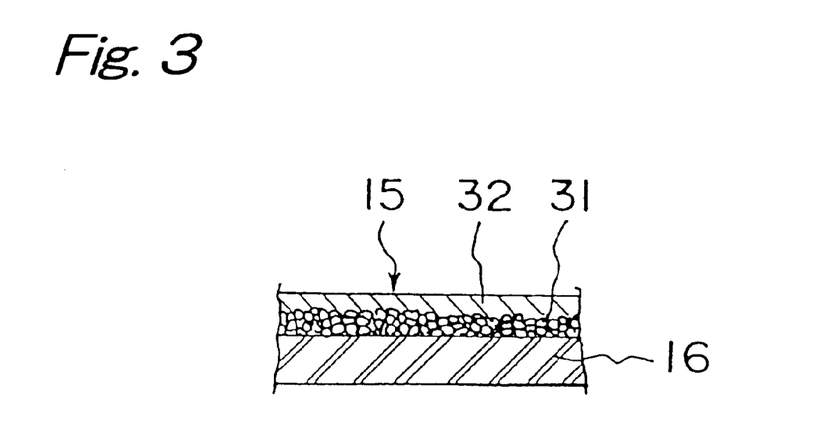
FIG. 3 is a partially enlarged cross-sectional view of a rod guide bearing part and bearing layer.

The bearing layer 15 comprises a porous sintered metal layer 31 and a synthetic resin layer 32, as shown in FIG. 3. The porous sintered metal layer 31 is fixed beforehand to the surface of the base material which is the inner circumferential surface 14 of the cylindrical bearing part 16. Part of the synthetic resin layer 32 is filled in the pores of the porous sintered metal layer 31, and part of it is fixed to the porous sintered metal layer 31 as a thin layer. The synthetic resin layer 32 comprises a polytetrafluoroethylene resin, polyacetal resin, or an oil-containing polyacetal resin which contains a lubricant oil.

Figure 2:
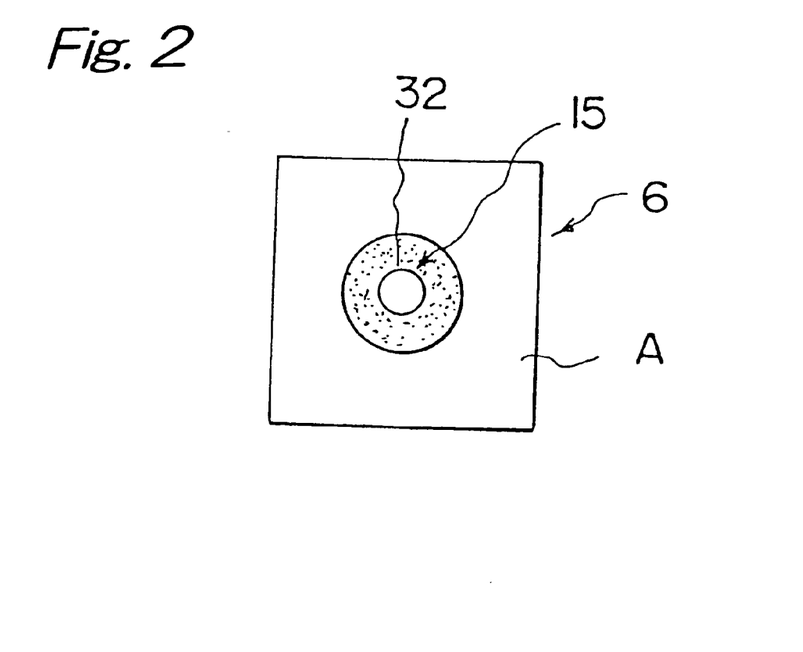
FIG. 2 is a plan view of a rod guide base material.

The rod guide 6 is formed by taking a circular or square thin steel plate A as shown in FIG. 2, wherein the bearing layer 15 described above has been pre-attached to the inner circumferential surface 14 of the cylindrical bearing part 16, and pressing this out and deep-drawing it into a cylindrical shape.

For this purpose, a ring of copper or copper alloy powder is placed on the surface of the thin steel plate A at a position which will become the bearing part 16, and this is heat sintered so that a ring-shaped porous sintered metal layer 31 is formed at the position of the bearing part 16 of the thin metal plate A. Next, the synthetic resin layer 32 is formed on the exposed porous surface of the porous sintered metal layer 31. In this process, part of a polytetrafuoroethylene resin, polyacetal resin, or an oil-containing polyacetal resin which contains a lubricant oil is filled in the pores of the porous sintered metal layer 31, and part is fixed to the porous sintered metal layer 31 as a thin layer.

In this way, a circular or square thin steel plate having a three-layer structure comprising the thin steel plate A, the porous sintered metal layer 31 and the synthetic resin layer 32 only in a ring part which will become the bearing part 16, is pressed out and deep-drawn into a cylindrical shape, and the bearing layer 15 is positioned on the inner circumferential surface of the cylindrical bearing part 16.

Therefore, the piston rod 5 comes in direct contact with the surface of the bearing layer 15 on the inner circumferential surface 14 of the cylindrical bearing part 16, and is supported free to slide. The tip of the piston rod 5 passes through the cap 46 and extends outside it, the projecting tip being connected to the vehicle body.

The oil seal 45 which acts as a seal is fitted between the piston rod 5 and cap 46 is fixed to the outer cylinder 3.

Hence, in the hydraulic damper bearing unit according to this invention, the motion of the piston rod 5 is guided by the bearing layer 15 which is previously fixed to the inner circumferential surface of the cylindrical bearing 16, so there is no risk that the bearing layer 15 will fall out due to the motion of the piston rod 5. There is therefore no need to form a stopping means such as a caulking part in the bearing part 16, and additional work or pressing is unnecessary. Assembly is very easy, and as a result, costs are largely reduced. As the rod guide has no join surface, there is no oil leakage from the join surface, and loss of function due to such leakage is prevented.

Further, the rod guide 6 is formed in a one-piece construction from a plate material by press-molding or deep-drawing, and it can therefore be easily manufactured with a desired precision. Consequently, a desirable smooth sliding motion of the piston rod 5 is obtained, there is no noise due to manufacturing defects, and there is no oil leakage in the inner cylinder 2.

Moreover, the bearing layer 15 comprises the porous sintered metal layer 31, and the synthetic resin layer 32 whereof part is filled in the pores of this porous sintered metal layer 31 and part is attached to the sintered metal layer 31 as a thin layer. The synthetic resin layer 32 is in direct contact with the piston rod 5 and guides it when it slides, so smooth sliding of the piston 5 is obtained.

In this case, low friction is still maintained due to the synthetic resin which is filled in the pores of the porous sintered metal layer 31 even if the synthetic resin on the surface wears out, so the desired characteristics can effectively be obtained for a long period of time.

The cylindrical bearing part 16 is supported by the connecting part 17 leaving a predetermined gap R between the engaging part 13 and the cylindrical bearing part 16, so even if the piston rod 5 is slightly inclined relative to the axis, the connecting part 17 elastically deforms so as to follow the inclination and allow inclination of the cylindrical bearing part 16. Therefore, the piston rod 5 slides smoothly even when it is inclined.

Figure 5:
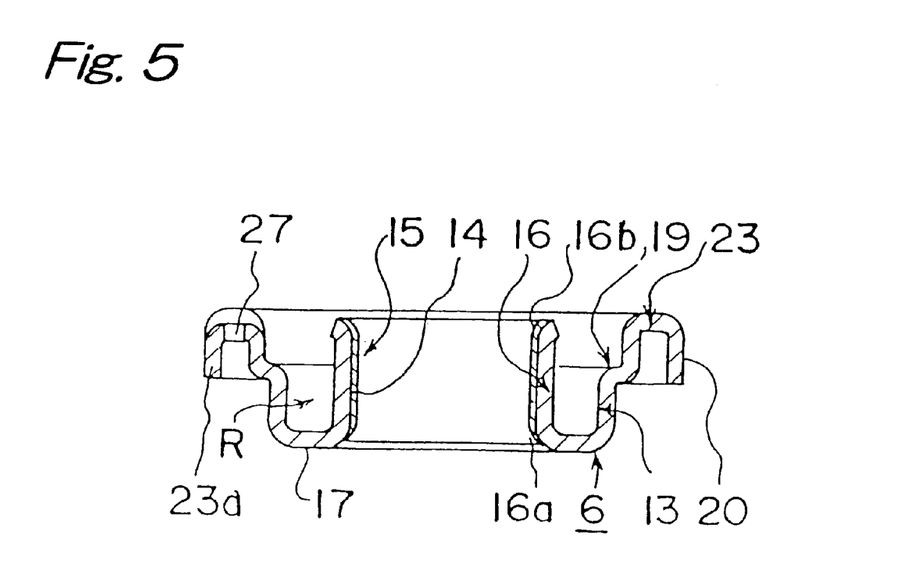
FIG. 5 is a cross-sectional view of a rod guide according to another embodiment.

FIG. 5 shows the rod guide 6 according to another embodiment of this invention. According to this embodiment, the upper and lower ends of the cylindrical bearing part 16 are curved outward. The bearing layer 15 corresponding to this curved part also curves outwards together with the cylindrical bearing part 16 of the base material so as to form curved surfaces 16*a*, 16*b*. Therefore, the piston rod 5 can be smoothly inserted in the bearing layer 15, and an excessive load does not affect the bearing layer 15 and bearing part 16 even if an uneven load acts after insertion. The remaining features of the construction are identical to those of the rod guide 6 of FIG. 4.

Figure 6:
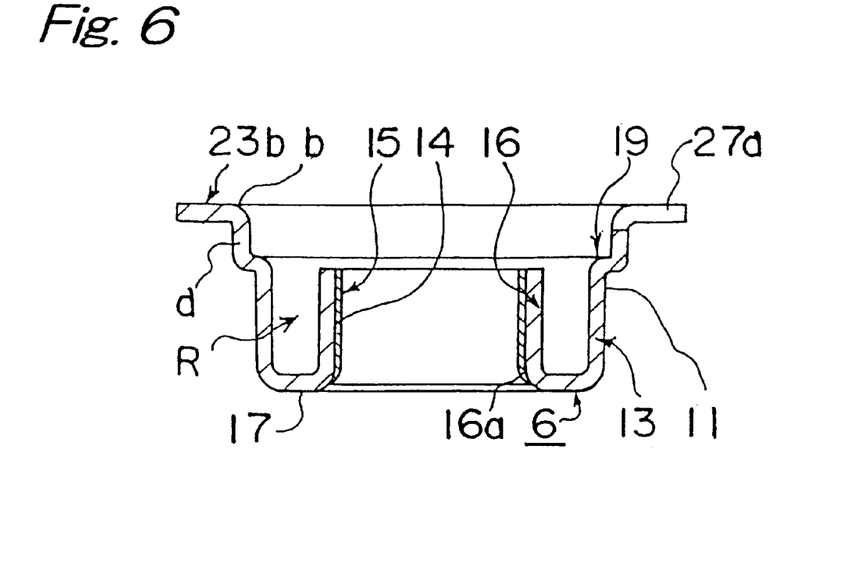
FIG. 6 is a cross-sectional view of a rod guide according to yet another embodiment.

FIG. 6 shows the rod guide 6 according to another embodiment of this invention. According to this embodiment, the outer cylinder attachment 23 comprises a flange b which extends radially outwards from the annular supporting part 19.

An outer cylinder attachment 23b comprises a cylindrical part a which starts from the annular supporting part 19, the flange b extending outwards from the cylindrical part a, and an oil return passage 27a formed by cutting out a part of the flange b. The flange b is attached by pressing, caulking or welding the outer cylinder 3 or cap 46. The remaining features of the construction are identical to those of the rod guide 6 of FIG. 4 or FIG. 5.

Figure 7:
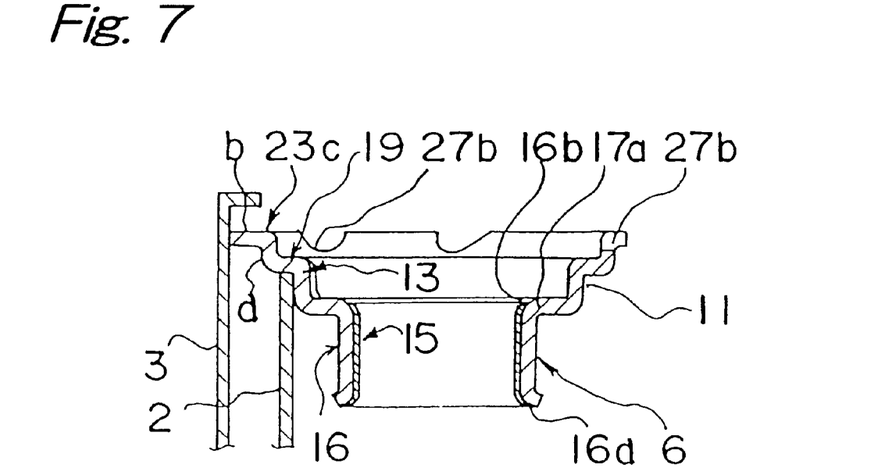
FIG. 7 is a cross-sectional view of a rod guide according to yet another embodiment.

FIG. 7 shows the rod guide 6 according to another embodiment of this invention. Herein, the cylindrical bearing part 16 is oriented downwards from the connecting part 17a of the cylindrical engaging part 13 which engages with the cylinder 2, and the bearing surface 15 is pre-attached to the inner circumferential surface of this bearing part 16. An outer cylinder attachment 23c comprises a cylindrical part a which starts from the annular supporting part 19 seated on the upper end of the inner cylinder 2 and the flange b, and plural oil return passages 27b are formed by cutting out the flange b. The remaining features of the construction and their effect are identical to those of the aforesaid embodiments.

Next, another embodiment of this invention will be described referring to FIG. 8.

According to this embodiment, the fixing structures of the oil seal and rod guide 6 are different from that of the first embodiment.

Specifically, the oil seal 50 which is a seal member comprises a dust lip 51, oil lip 52 and a horizontal core part 54 provided with a core 53. The cylindrical part 23a of the outer cylinder attachment 23 forming the rod guide 6 engages with the inner circumference of the outer cylinder 3, and the outer cylinder attachment 23 and core part 54 are fixed by caulking the upper end of the outer cylinder 3 to the inside. The rod guide 6 is identical to that shown in FIG. 4.

Figure 8:
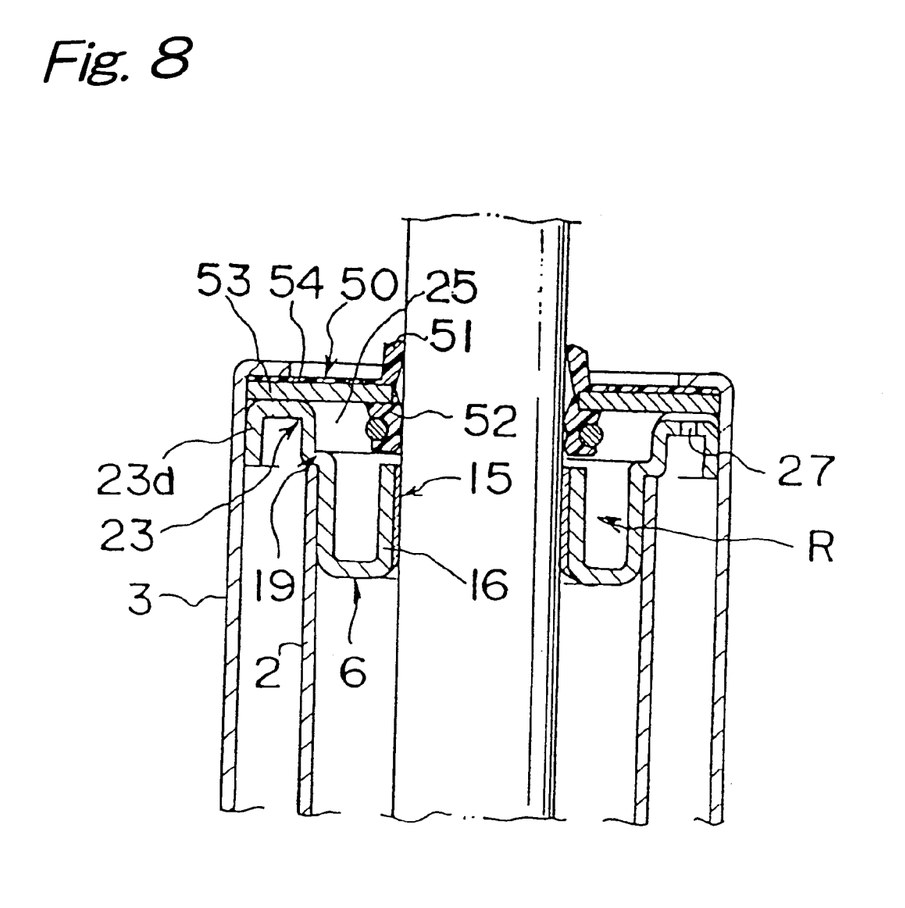
FIG. 8 is a partial cross-sectional view of a multi-cylinder type hydraulic damper according to another embodiment of this invention.
Figure 9:
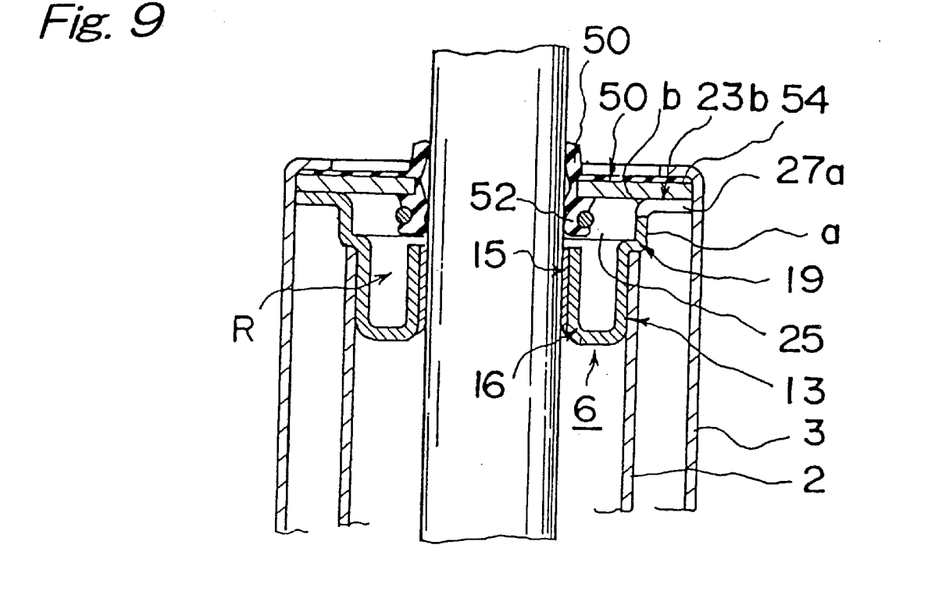
FIG. 9 is a partial cross-sectional view of a multi-cylinder type hydraulic damper according to yet another embodiment of this invention.

FIG. 9 shows another embodiment of this invention. A part of the rod guide 6 is different from FIG. 8.

The oil seal 50 is the same as that of FIG. 8, but the rod guide 6 is the same as that shown in FIG. 6. In this case, the flange b forming the outer attachment 23b engages with the inner circumference of the outer cylinder 3, and this flange b and core part 54 are fixed by caulking the upper end of the outer cylinder 3.

Next, an embodiment of the single cylinder type hydraulic damper will be described referring to FIG. 10–FIG. 13.

The single cylinder type hydraulic damper differs from the multi-cylinder type hydraulic damper in that there is no outer cylinder 3.

In the case of this single cylinder type hydraulic damper, the piston rod 5 is inserted free to move via the piston in the cylinder 2. The oil seal or gas seal which is a seal member 55, and the rod guide 6, are installed in series at the end of the cylinder 2. The piston rod 5 is guided free to slide by the rod guide 6 and seal member 55.

In this case, the shape of the rod guide 6 is slightly different from that of the aforesaid multi-cylinder type hydraulic damper, but the structure of the cylindrical bearing part 16 and the bearing layer 15 on its inner circumference is the same as that described above, and the method of forming them is the same.

Figure 10:
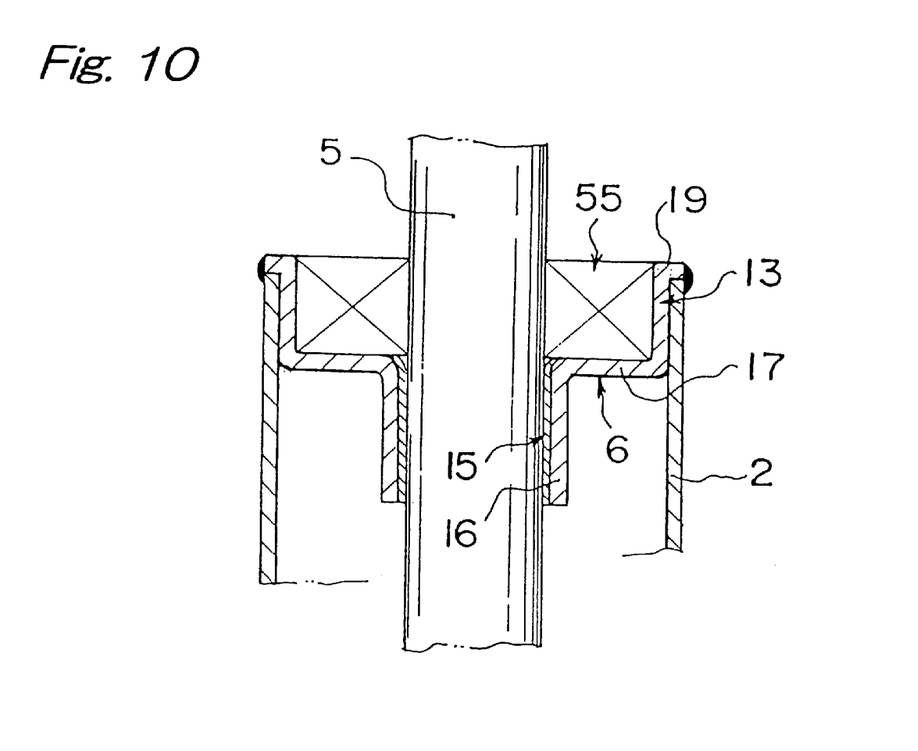
FIG. 10 is a partial cross-sectional view of a single cylinder type hydraulic damper according to another embodiment of this invention.

In the hydraulic damper of FIG. 10, the piston rod 5 is inserted free to move in the cylinder 2. The piston rod 5 is guided free to slide by the seal member 55 and rod guide 6 provided at the end of the cylinder 2. The rod guide 6 comprises the cylindrical engaging part 13 which engages with the cylinder 2, the cylindrical bearing part 16 which guides the piston rod 5, and the bearing layer 15 previously fixed to the inner circumferential surface of the cylindrical bearing part 16 which slides on the outer surface of the piston rod 5.

The rod guide 6 is formed by previously fixing the bearing layer 15 at a position on the surface of the base material, comprising thin steel plate, which will become the aforesaid bearing part 16, and then forming it into a one-piece construction by deep-drawing or press-molding.

In this case, the cylindrical bearing part 16 and bearing layer 15 are oriented downwards leaving a predetermined gap R from the cylindrical engaging part 13 in a radial direction via the connecting part 17 below the cylindrical engaging part 13. The annular supporting part 19 extending outwards in a radial direction is formed above the cylindrical engaging part 13. This annular supporting part 19 is seated above the upper end face of the cylinder 2, and its outer edge is fixed by welding or caulking the upper end of the cylinder 2. The seal member 55 is fixed by fitting it inside the cylindrical engaging part 13.

Figure 11:
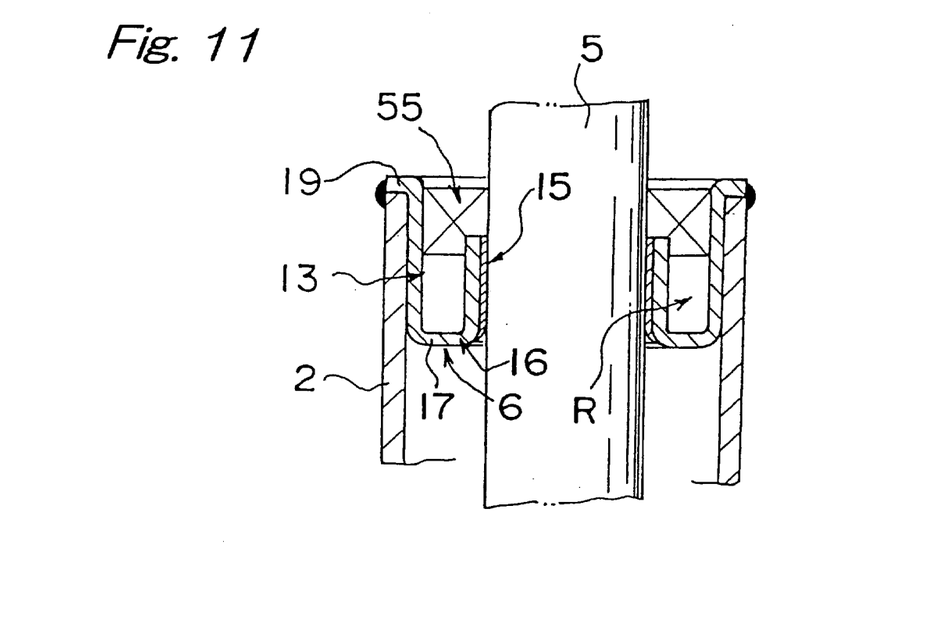
FIG. 11 is a partial cross-sectional view of a single cylinder type hydraulic damper according to yet another embodiment of this invention.

FIG. 11 shows another embodiment. According to this embodiment, the cylindrical bearing part 16 rises above the inner edge of the connecting part 17, and is installed parallel to the cylindrical engaging part 13 leaving a predetermined distance R. The remaining features of the construction are identical to those of FIG. 10.

Figure 12:
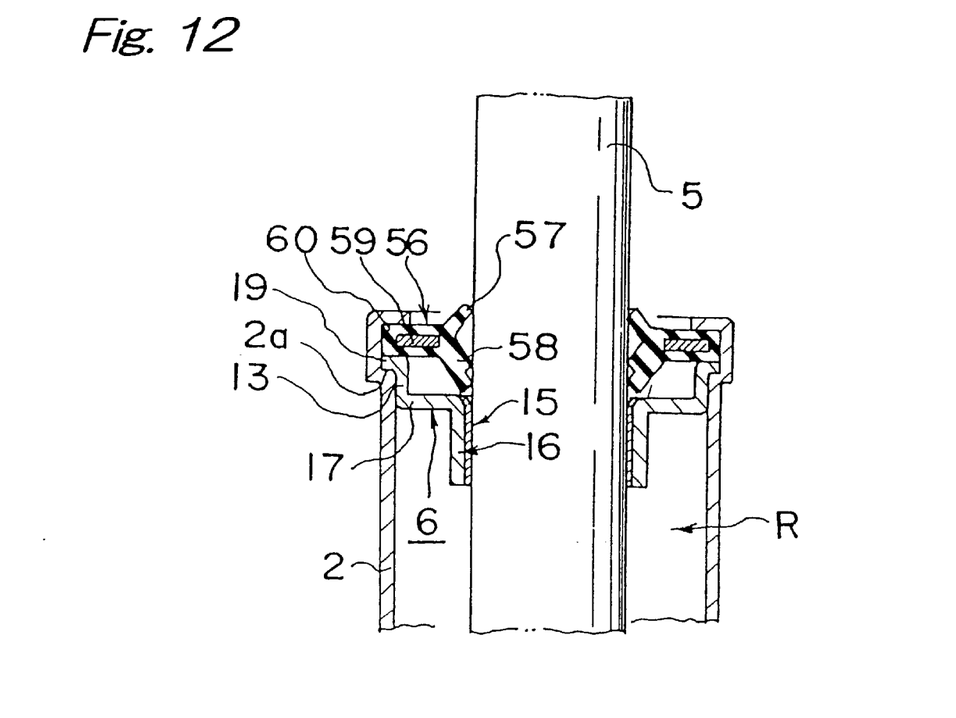
FIG. 12 is a partial cross-sectional view of a single cylinder type hydraulic damper according to yet another embodiment of this invention.

FIG. 12 shows another embodiment. According to this embodiment, the rod guide 6 and seal member 56 are gripped by caulking the upper end of the cylinder 2.

The seal member 56 comprises a dust lip 57, oil lip 58 and core part 60 comprising a core 59. The rod guide 6 has the same construction as that shown in FIG. 10. In this case, a step 2a is formed at the upper end of the cylinder 2, and the annular supporting part 19 is seated on this step 2a. Next, the core part 60 and annular supporting part 19 are gripped and fixed by caulking the upper end of the cylinder 2.

Figure 13:
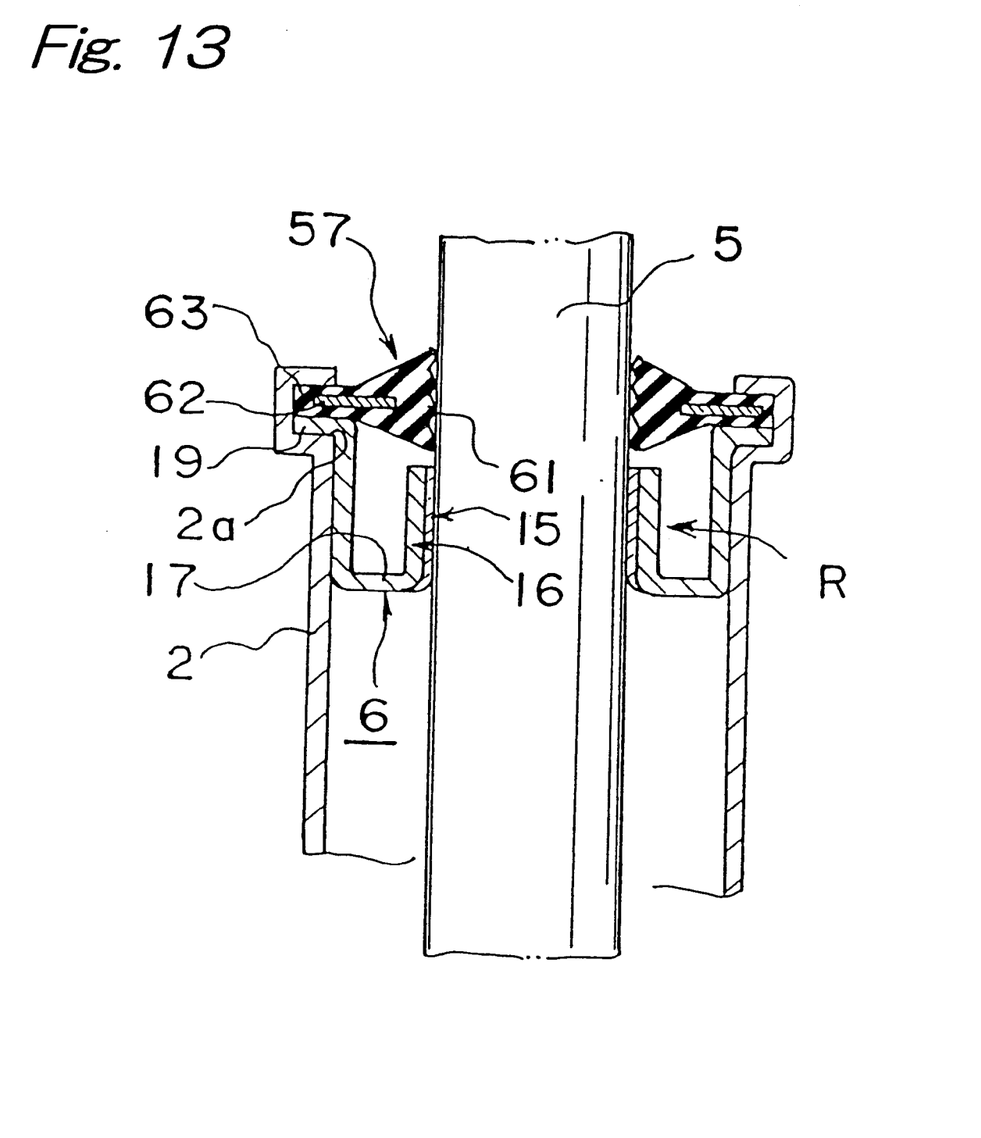
FIG. 13 is a partial cross-sectional view of a single cylinder type hydraulic damper according to yet another embodiment of this invention.

FIG. 13 shows another embodiment of this invention. In this case, the rod guide 6 has the same construction as that shown in FIG. 1. The seal member 57 comprises plural lips 61 on the inner circumference, and a core part 63 comprising a core 62. The annular supporting part 19 seated on the step 2a of the cylinder 2 and the core part 63 are gripped and fixed by caulking the upper end of the cylinder 2.

Figure 14:
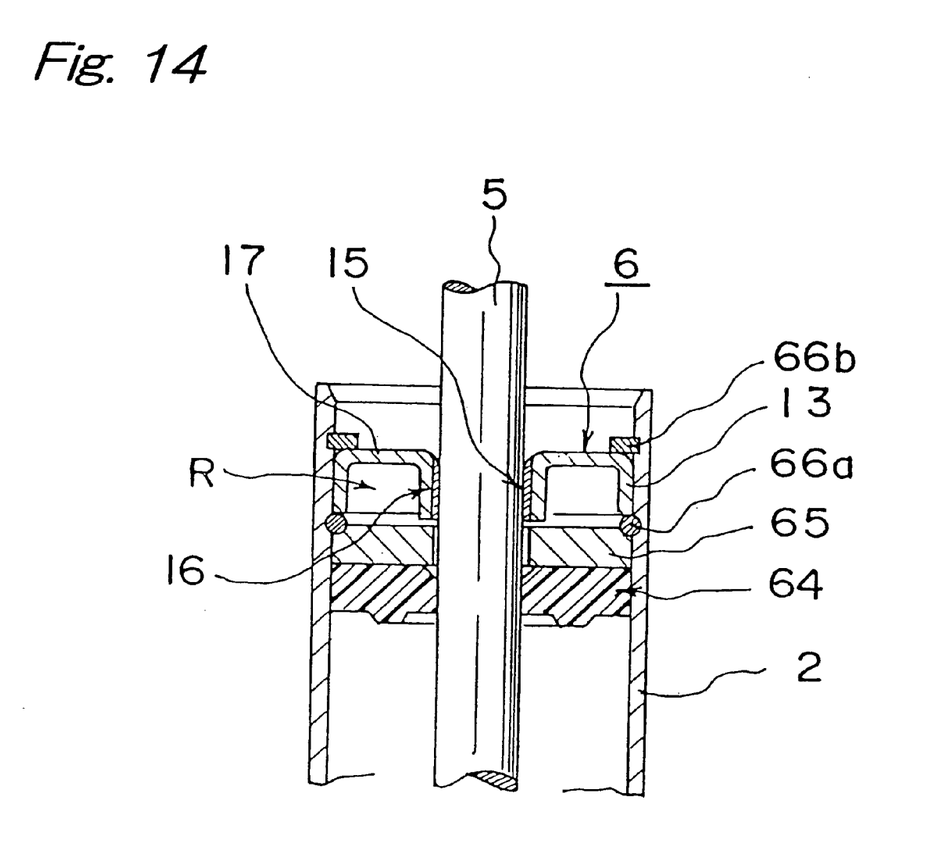
FIG. 14 is a partial cross-sectional view of a single cylinder type hydraulic damper according to yet another embodiment of this invention.

FIG. 14 shows yet another embodiment of this invention. This is a single cylinder type hydraulic damper, and the rod guide 6 has an effectively inverted U-shape cross-section as in FIG. 11. The annular supporting pert 19 is omitted, and the rod guide 6 is fixed by snap rings 66a, 66b attached to the inner circumference of the cylinder 2. A seal stopper 65 and oil seal 64 are arranged in series on the inside of the cylinder 2, and the bearing layer 15 of the cylindrical bearing part 16 is a dry bearing state.

This construction may of course be applied also to a gas spring.

The action of the rod guide 6 shown in FIG. 10–FIG. 14 is the same as that shown in FIG. 1. These constructions relate to a single cylinder type damper, but identical constructions may be applied to a single cylinder type gas spring for suspension or a single cylinder type gas spring for opening and closing a vehicle back door.

INDUSTRIAL FIELD OF APPLICATION

This invention may be applied as a bearing unit in a multi-cylinder pe hydraulic damper, single cylinder type hydraulic damper or single cylinder type gas spring for suspension, or a single cylinder type gas spring for a vehicle back door.

What is claimed is:

1. A single cylinder type hydraulic damper or gas spring, comprising:
   a cylinder;
   a piston rod inserted in the cylinder such that it is free to move;
   a seal member; and
   a rod guide,
   wherein said piston rod is guided such that it is free to slide by the seal member and the rod guide at one end of said cylinder,
   wherein said rod guide comprises:
      a cylindrical engaging part which engages with the end of said cylinder,
      a cylindrical bearing part which guides said piston rod, and
      a low friction bearing layer fixed to an inner circumferential surface of said cylindrical bearing part and which is in contact with an outer circumference of said piston rod,
   wherein said bearing layer is previously fixed only at a position of a base material comprising a thin steel plate which becomes said cylindrical bearing part, and
   wherein said rod guide is formed in a one-piece construction by press-molding or deep-drawing said base material, together with said bearing layer fixed thereto.

2. A single cylinder type hydraulic damper or gas spring according to claim 1, wherein said rod guide further comprises an annular supporting part which extends outwards in a radial direction from an upper end of said cylindrical engaging part, and said annular supporting part is joined to the end of said cylinder by welding or caulking.

3. A single cylinder type hydraulic damper or gas spring according to claim 1, wherein the seal member has a core, and is provided in series with said rod guide at the end of said cylinder, and wherein said rod guide includes an annular supporting part extending outwards in a radial direction from an upper end of said cylindrical engaging part and being seated in a step provided in a vicinity of the end of said cylinder, wherein said annular supporting part is joined to the end of said cylinder by caulking together with a core part of said seal member.

4. A single cylinder type hydraulic damper or gas spring according to claim 1, wherein the seal member is arranged in series further inside than said rod guide along an axis of said cylinder.

5. A multi-cylinder type hydraulic damper or gas spring, comprising:
   an inner cylinder;
   a piston rod inserted in the inner cylinder such that it is free to move;
   an outer cylinder forming a reservoir outside said inner cylinder;
   a seal member; and
   a rod guide,
   wherein said piston rod is guided such that it is free to slide by the seal member and the rod guide provided at one end of said inner cylinder and one end of said outer cylinder,
   wherein said rod guide comprises:
      a cylindrical engaging part which engages with the end of said inner cylinder,
      a cylindrical bearing part which guides said piston rod,
      a low friction bearing layer fixed to an inner circumferential surface of said cylindrical bearing part and which is in contact with an outer circumference of said piston rod, and
      an outer cylinder attachment joined to one end of said outer cylinder,
   wherein said bearing layer is previously fixed only at a position of a base material comprising a thin steel plate which becomes said cylindrical bearing part, and
   wherein said rod guide is formed in a one-piece construction by press-molding or deep-drawing said base material, together with said bearing layer fixed thereto.

6. A multi-cylinder type hydraulic damper or gas spring according to claim 5, wherein said outer cylinder attachment comprises a cylindrical part of a larger diameter than said cylindrical bearing part.

7. A multi-cylinder type hydraulic damper or gas spring according to claim 6, wherein said outer cylinder attachment comprises a flange which extends radially outwards from said cylindrical bearing part.

8. A multi-cylinder type hydraulic damper or gas spring according to claim 5, wherein said outer cylinder attachment is welded to said outer cylinder or a cap joined to said outer cylinder.

9. A multi-cylinder type hydraulic damper or gas spring according to claim 5, wherein said seal member is an oil seal comprising a core, and is provided in series with the rod guide at the end of said inner cylinder and the end of the outer cylinder, and said outer cylinder attachment and a core part of said oil seal are joined to the end of said outer cylinder by caulking.

10. A multi-cylinder type hydraulic damper or gas spring according to claim 5, wherein an oil leak return passage connected to the reservoir is provided in said outer cylinder attachment.

11. A single cylinder type hydraulic damper or gas spring according to claim 1, wherein said bearing layer comprises a porous sintered metal layer fixed to the inner circumferential surface of said cylindrical bearing part, and a synthetic resin layer whereof part of the synthetic resin layer fills in the pores of said porous sintered metal layer and part is attached as a thin layer on a surface of said porous sintered metal layer.

12. A single cylinder type hydraulic damper or gas spring according to claim 1, wherein said cylindrical engaging part is connected via a connecting part with the cylindrical bearing part leaving a gap outside said cylindrical bearing part.

13. A single cylinder type hydraulic damper or gas spring according to claim 1, wherein a curved surface is formed on either the upper end, lower end or both ends of said bearing layer.

14. A single cylinder type hydraulic damper or gas spring according to claim 2, wherein the seal member has a core, and is provided in series with said rod guide at the end of said cylinder, and wherein said rod guide includes an annular supporting part extending outwards in a radial direction from an upper end of said cylindrical engaging part and being seated in a step provided in a vicinity of the end of said cylinder, wherein said annular supporting part is joined to the end of said cylinder by caulking together with a core part of said seal member.

15. A single cylinder type hydraulic damper or gas spring according to claim 2:
   wherein the seal member is arranged in series further inside than said rod guide along an axis of said cylinder.

16. A multi-cylinder type hydraulic damper or gas spring according to claim 5, wherein said bearing layer comprises a porous sintered metal layer fixed to the inner circumferential surface of said cylindrical bearing part, and a synthetic resin layer whereof part of the synthetic resin layer fills in the pores of said porous sintered metal layer and part is attached as a thin layer on a surface of said porous sintered metal layer.

17. A multi-cylinder type hydraulic damper or gas spring according to claim 5, wherein said cylindrical engaging part is connected via a connecting part with the cylindrical bearing part leaving a gap outside said cylindrical bearing part.

18. A multi-cylinder type hydraulic damper or gas spring according to claim 5, wherein a curved surface is formed on either the upper end, lower end or both ends of said bearing layer.

* * * * *